United States Patent
Hamada et al.

(10) Patent No.: US 10,166,739 B2
(45) Date of Patent: Jan. 1, 2019

(54) DECORATION PANEL AND METHOD FOR MANUFACTURING DECORATION PANEL

(71) Applicant: Yamaha Fine Technologies Co., Ltd., Hamamatsu-shi, Shizuoka-Ken (JP)

(72) Inventors: Yutaka Hamada, Shizuoka-Ken (JP); Aiko Samizo, Hamamatsu (JP); Yoshihisa Maruyama, Hamamatsu (JP); Masahiro Hirato, Hamamatsu (JP)

(73) Assignee: Yamaha Fine Technologies Co., Ltd., Shizuoka-Ken (JP)

( * ) Notice: Subject to any disclaimer, the term of this patent is extended or adjusted under 35 U.S.C. 154(b) by 269 days.

(21) Appl. No.: 14/869,458

(22) Filed: Sep. 29, 2015

(65) Prior Publication Data

US 2016/0089850 A1    Mar. 31, 2016

(30) Foreign Application Priority Data

Sep. 30, 2014  (JP) .................. 2014-201153

(51) Int. Cl.
  *B32B 3/24*   (2006.01)
  *B32B 3/28*   (2006.01)
  (Continued)

(52) U.S. Cl.
  CPC .......... *B32B 3/266* (2013.01); *B29C 45/1418* (2013.01); *B29C 45/14811* (2013.01); *B32B 3/28* (2013.01); *B32B 15/08* (2013.01); *B32B 15/10* (2013.01); *B32B 21/08* (2013.01); *B32B 21/14* (2013.01); *B44C 3/005* (2013.01); *B44C 3/08* (2013.01); *B44C 3/10* (2013.01);
  (Continued)

(58) Field of Classification Search
  None
  See application file for complete search history.

(56) References Cited

U.S. PATENT DOCUMENTS 1,643,045 A  *  9/1927  Auld .................. B44C 1/26
                                              428/67
1,725,997 A  *  8/1929  Price .................. G09F 13/06
                                              362/812

(Continued)

FOREIGN PATENT DOCUMENTS

DE    2944797 A1 *  1/1982 ....... B29V 45/14778
DE    19546551 C1 *  1/1997 ....... B29C 45/14467

(Continued)

OTHER PUBLICATIONS

Machine Translation of JP 05269921 A, Oct. 1993.*

(Continued)

*Primary Examiner* — Jeffrey A Vonch
(74) *Attorney, Agent, or Firm* — Blank Rome LLP

(57) ABSTRACT

A decoration panel of the present invention includes an outer layer having a through hole formed thereon which is opened to a front surface to be decorated and a back surface on a side opposite to the front surface, and a decoration layer including an inlay pattern portion which is part of the decoration layer entering the inside of the through hole from the back surface side being curved and deformed, the decoration layer being arranged on the entire back surface of the outer layer and having an approximately uniform layer thickness.

6 Claims, 5 Drawing Sheets

(51) Int. Cl.

| | | |
|---|---|---|
| *B32B 15/10* | (2006.01) | |
| *B32B 21/04* | (2006.01) | |
| *B32B 21/14* | (2006.01) | |
| *B32B 3/26* | (2006.01) | |
| *B32B 15/08* | (2006.01) | |
| *B29C 45/14* | (2006.01) | |
| *B44C 3/00* | (2006.01) | |
| *B44C 5/04* | (2006.01) | |
| *B44C 3/08* | (2006.01) | |
| *B44C 3/10* | (2006.01) | |
| *B32B 21/08* | (2006.01) | |
| *B29K 105/00* | (2006.01) | |
| *B29L 31/00* | (2006.01) | |
| *B29L 9/00* | (2006.01) | |
| *B32B 3/30* | (2006.01) | |
| *B32B 37/18* | (2006.01) | |
| *B32B 38/10* | (2006.01) | |
| *B32B 38/06* | (2006.01) | |
| *B32B 37/12* | (2006.01) | |
| *B29K 711/14* | (2006.01) | |
| *B29K 705/00* | (2006.01) | |
| *B29C 65/48* | (2006.01) | |
| *B44C 5/00* | (2006.01) | |
| *B29L 7/00* | (2006.01) | |
| *B32B 15/20* | (2006.01) | |
| *B32B 27/00* | (2006.01) | |

(52) U.S. Cl.
CPC ............ *B44C 5/043* (2013.01); *B44C 5/0415* (2013.01); *B29C 65/48* (2013.01); *B29C 2045/14237* (2013.01); *B29C 2045/14868* (2013.01); *B29C 2045/14934* (2013.01); *B29C 2793/009* (2013.01); *B29C 2793/0054* (2013.01); *B29C 2793/0081* (2013.01); *B29K 2105/256* (2013.01); *B29K 2705/00* (2013.01); *B29K 2711/14* (2013.01); *B29L 2007/002* (2013.01); *B29L 2009/00* (2013.01); *B29L 2009/003* (2013.01); *B29L 2031/722* (2013.01); *B32B 3/30* (2013.01); *B32B 15/20* (2013.01); *B32B 21/04* (2013.01); *B32B 27/00* (2013.01); *B32B 37/12* (2013.01); *B32B 37/18* (2013.01); *B32B 38/06* (2013.01); *B32B 38/10* (2013.01); *B32B 2451/00* (2013.01); *B32B 2607/00* (2013.01); *B44C 5/005* (2013.01); *B44C 5/0453* (2013.01); *Y10S 428/9133* (2013.01); *Y10T 428/22* (2015.01); *Y10T 428/24066* (2015.01); *Y10T 428/24331* (2015.01); *Y10T 428/24339* (2015.01); *Y10T 428/24521* (2015.01); *Y10T 428/24736* (2015.01); *Y10T 428/31703* (2015.04)

(56) References Cited

U.S. PATENT DOCUMENTS

| | | | | | |
|---|---|---|---|---|---|
| 2,069,393 | A | * | 2/1937 | Sloan | B05D 7/06 156/220 |
| 2,116,471 | A | * | 5/1938 | Nelson | G09F 19/00 40/615 |
| 2,545,286 | A | * | 3/1951 | Kessler | B27D 1/04 156/223 |
| 2,695,857 | A | * | 11/1954 | Rehbock | B27D 1/04 101/22 |
| 2,853,117 | A | * | 9/1958 | Dibblee | G02B 6/0033 156/154 |
| 3,878,015 | A | * | 4/1975 | Johnston | B27D 1/08 144/352 |
| 3,961,112 | A | * | 6/1976 | Genevitz | B44C 3/005 428/29 |
| 4,403,004 | A | * | 9/1983 | Parker | B44C 1/14 156/243 |
| 5,225,264 | A | * | 7/1993 | Kato | A47B 96/206 428/137 |
| 5,264,062 | A | * | 11/1993 | Ohsumi | B27D 1/00 156/228 |
| 5,744,210 | A | * | 4/1998 | Hofmann | B29C 70/683 428/106 |
| 5,811,169 | A | * | 9/1998 | Ohsumi | B29C 45/1671 428/106 |
| 5,938,881 | A | * | 8/1999 | Kawata | B29C 43/203 156/307.4 |
| 6,633,019 | B1 | | 10/2003 | Gray | |
| 6,887,413 | B1 | * | 5/2005 | Schumacher | B29C 45/1418 264/135 |
| 2002/0031620 | A1 | * | 3/2002 | Yuzawa | B27D 1/00 428/1.1 |
| 2003/0009976 | A1 | * | 1/2003 | Hauser | B32B 3/00 52/656.4 |
| 2003/0087075 | A1 | * | 5/2003 | Peters | B29C 45/14688 428/212 |
| 2004/0056382 | A1 | | 3/2004 | Shaner et al. | |
| 2009/0022964 | A1 | * | 1/2009 | Suzuki | B32B 27/00 428/203 |
| 2010/0053754 | A1 | * | 3/2010 | Chapman | B29D 11/00605 359/530 |
| 2010/0136298 | A1 | * | 6/2010 | Marion | B60R 13/10 428/187 |
| 2012/0032592 | A1 | * | 2/2012 | Breunig | B29C 45/1643 315/77 |
| 2012/0237725 | A1 | * | 9/2012 | Stossel | B60R 13/02 428/139 |
| 2013/0004720 | A1 | * | 1/2013 | Mattellone | B32B 15/10 428/157 |
| 2013/0101799 | A1 | * | 4/2013 | Trier | B29C 45/1418 428/164 |
| 2013/0266783 | A1 | * | 10/2013 | Stadler | B32B 15/10 428/213 |
| 2013/0323460 | A1 | * | 12/2013 | Hoch | B32B 3/12 428/117 |
| 2014/0183892 | A1 | | 7/2014 | Beau et al. | |
| 2015/0356895 | A1 | * | 12/2015 | Boppart | G09F 13/0404 362/511 |

FOREIGN PATENT DOCUMENTS

| | | | | | |
|---|---|---|---|---|---|
| DE | 19920915 | A1 | * | 11/2000 | ............ B32B 3/14 |
| DE | 102006062345 | A1 | * | 6/2008 | ....... B29C 45/14688 |
| DE | 102008041701 | A1 | | 3/2010 | |
| DE | 202011050956 | U1 | * | 8/2012 | ......... B29C 45/1418 |
| DE | 102015003448 | A1 | * | 8/2015 | ............. B60R 13/02 |
| EP | 0612609 | A1 | * | 8/1994 | ................ B27D 1/00 |
| EP | 1308259 | A2 | | 5/2003 | |
| FR | 2387708 | A1 | * | 11/1978 | ............. G09F 7/165 |
| GB | 1382319 | A | * | 1/1975 | ............... B44C 1/26 |
| JP | 52087212 | A | * | 7/1977 | |
| JP | 03030921 | A | * | 2/1991 | ....... B29C 45/14811 |
| JP | 03275351 | A | * | 12/1991 | |
| JP | 04101829 | A | * | 4/1992 | |
| JP | 05004306 | A | * | 1/1993 | ....... B29C 45/14811 |
| JP | 05269921 | A | * | 10/1993 | |
| JP | 2003-326897 | A | | 11/2003 | |
| JP | 2003326897 | A | * | 11/2003 | |
| JP | 2007118457 | A | * | 5/2007 | |
| WO | WO-2006106232 | A2 | * | 10/2006 | ................ B27D 1/00 |

OTHER PUBLICATIONS

Machine Translation of DE 102008041701 A1, Mar. 2010.*
Extended European Search report dated Feb. 17, 2016, issued in corresponding European Application No. 15187353.6.

* cited by examiner

DECORATION PANEL AND METHOD FOR MANUFACTURING DECORATION PANEL

BACKGROUND OF THE INVENTION

Field of the Invention

The present invention relates to a decoration panel and method for manufacturing a decoration panel.

Priority is claimed on Japanese Patent Application No. 2014-201153, filed Sep. 30, 2014, the content of which is incorporated herein by reference.

Description of Related Art

In the related art, a manufacturing method of a decoration panel is known in which a through hole is formed in part of an outer layer of a stacked body formed by superimposing a plurality of layers which are different from each other, and an inner layer is designed to be seen through the through hole of the outer layer (for example, refer to U.S. Pat. No. 6,633,019 B1).

In the method disclosed in U.S. Pat. No. 6,633,019 B1, part of the outer layer is removed from a composite body formed by stacking the outer layer and the inner layer via laser processing such that the through hole having a predetermined design pattern is formed in the outer layer. When the outer layer of the stacked body is removed using the laser processing or the like according to the technology disclosed in U.S. Pat. No. 6,633,019 B1, the inner layer seen through the through hole of the outer layer is exposed into the shape of a flat surface in a position lower than the outermost surface of the outer layer.

In addition, in Japanese Unexamined Patent Application, First Publication No. 2003-326897, performing injection molding with respect to a decorative material having a window hole to which an inlay member can be inserted from a back side after filling the window hole with an inlay member is disclosed as a method for efficiently producing a decoration panel having an inlay pattern.

In the technology disclosed in U.S. Pat. No. 6,633,019 B1, the outer surface of the inner layer which can be seen through the through hole of the outer layer is a monotonous flat surface, and freedom of design is low. In the technology disclosed in Japanese Unexamined Patent Application, First Publication No. 2003-326897, it takes a long time to fill the window hole with the inlay member, or it is necessary to accurately match the dimensions of the inlay member and the window hole, and thus productivity is low.

SUMMARY OF THE INVENTION

The present invention has been made in consideration of the circumstances described above, and an object of the present invention is to provide a decoration panel which can be easily produced with high freedom of design, and a manufacturing method thereof.

A decoration panel according to an aspect of the present invention includes an outer layer having a through hole formed thereon, wherein the through hole is opened to a front side and a back side of the outer layer; and a decoration layer arranged on the back side of the outer layer with an approximately uniform layer thickness, in which the decoration layer includes an inlay pattern portion which is part of the decoration layer curving to enter the through hole from the back side of the outer layer.

The decoration layer may be coherent to at least an opening end of the through hole on the back side with the inlay pattern portion, and may be curved towards an inside of the through hole.

The decoration panel according to the aspect may further include an inner layer arranged on a surface of the decoration layer on a side opposite to a surface which is in contact with the outer layer and having an approximately uniform layer thickness, the inner layer having a surface convexly curved in a direction towards the front side of the outer layer from the back side of the outer layer along a layer thickness direction of the outer layer in a region within the through hole as seen from the layer thickness direction of the outer layer; and a molded resin layer arranged on a surface of the inner layer on a side opposite to a surface which is in contact with the decoration layer.

A decoration panel according to another aspect of the present invention includes an outer layer having a through hole formed thereon, wherein the through hole is opened to a front side and a back side of the outer layer; a decoration layer arranged on the back side of the outer layer so as to cover an opening of the through hole on the back side and having an approximately uniform layer thickness; an inner layer arranged on a surface of the decoration layer on a side opposite to a surface which is in contact with the outer layer; and a molded resin layer arranged on a surface of the inner layer on a side opposite to a surface which is in contact with the decoration layer.

In each of the aspects, the outer layer may be formed of a wooden material, and the decoration layer may be formed of a material which is different from that of the outer layer. The decoration layer may be formed of a metal material.

A method for manufacturing a decoration panel according to the present invention includes; preparing a lamination of a first layer and a second layer; removing part of the first layer to form a through hole which exposes the second layer; and pressing the lamination from the second layer side toward the first layer side, and curving and deforming the second layer such that part of the second layer is inserted into the through hole.

In the method, a fluid body of a resin may flow into the molding die such that the fluid body is in contact with the second layer, and the fluid body may be solidified under pressure.

According to the present invention, a decoration panel can be easily produced with high freedom of design.

DETAILED DESCRIPTION OF THE INVENTION (First Embodiment)

Figure 1:
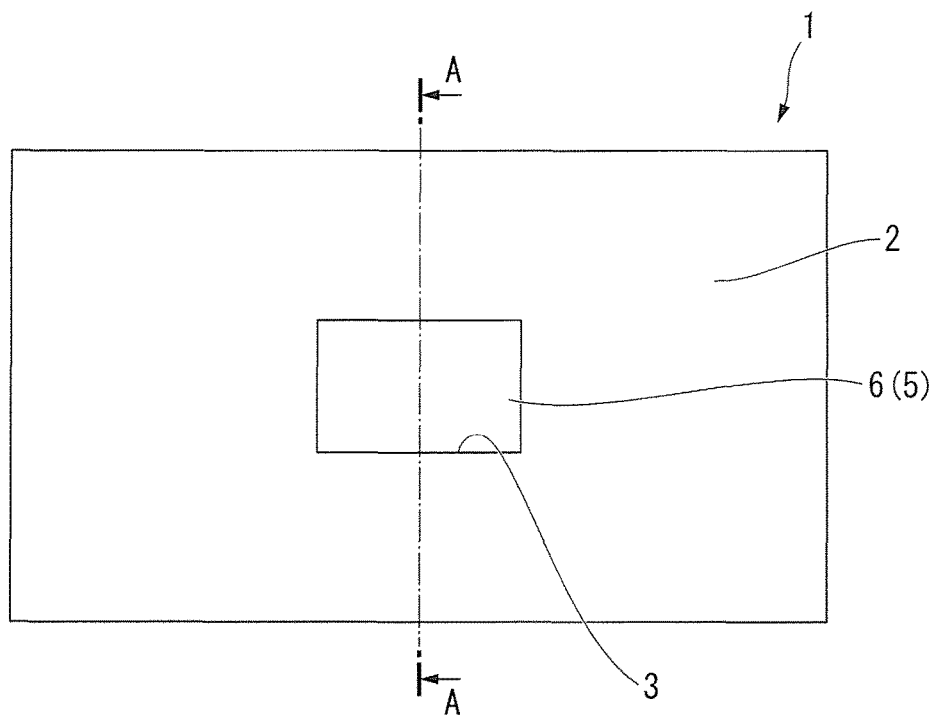
FIG. 1 is a plan view illustrating a decoration panel according to a first embodiment of the present invention.
Figure 2:
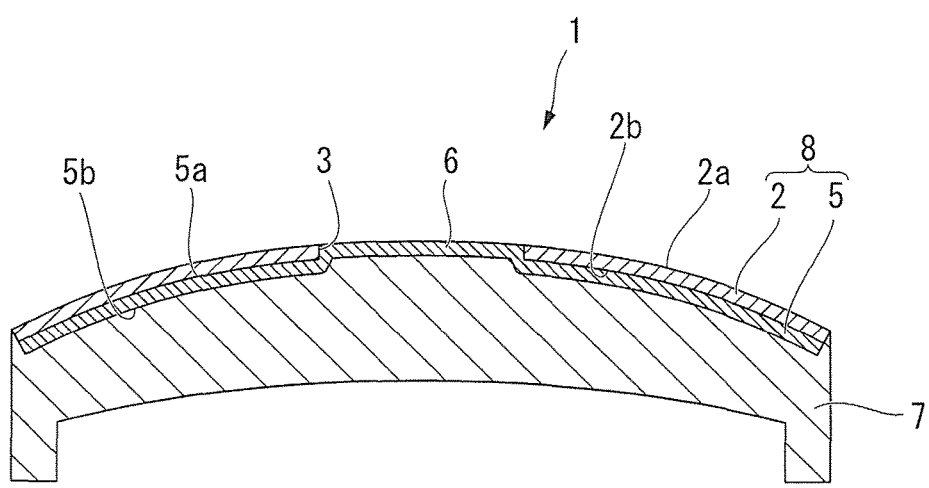
FIG. 2 is a sectional view cut along line A-A of FIG. 1.
Figure 3:
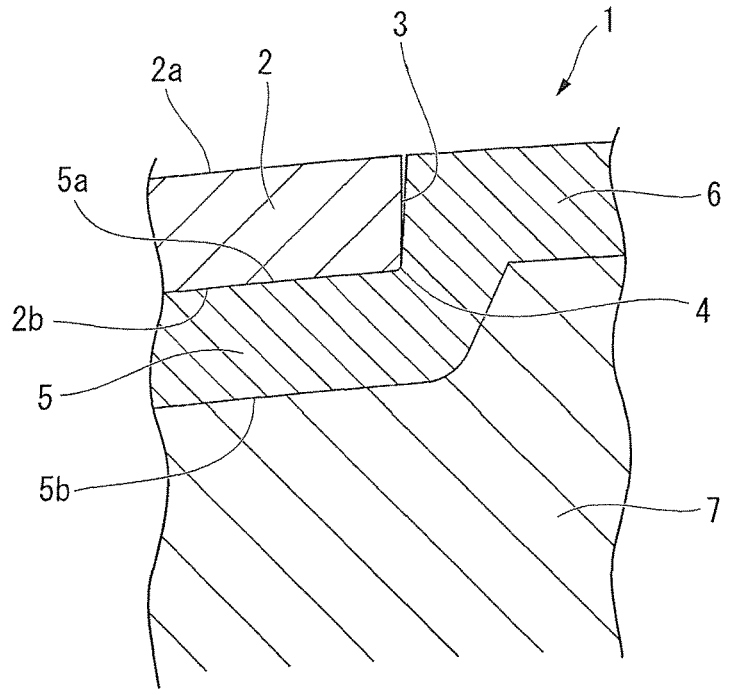
FIG. 3 is a sectional view in which part of FIG. 2 is enlarged.

A first embodiment of the present invention will be described. FIG. 1 is a plan view of a decoration panel of this embodiment. FIG. 2 is a sectional view cut along line A-A of FIG. 1. FIG. 3 is an enlarged view of FIG. 2.

As illustrated in FIG. 1 and FIG. 2, a decoration panel 1 includes an outer layer 2, a decoration layer 5, and a molded resin layer 7.

The decoration panel 1 is a panel in which the molded resin layer 7 in contact with the decoration layer 5 is integrated with a stacked body 8 formed by stacking the outer layer 2 and the decoration layer 5 in this order using insert molding.

The outer layer 2 illustrated in FIG. 3 is a sheet-like member having a decoration on a front side 2a. A through hole 3 is formed in the outer layer 2 to be opened to both of the front side 2a and a side opposite thereto (a back side 2b). In this embodiment, the outer layer 2 is formed of a wooden material. The decoration of the front side of the outer layer 2 exemplified in this embodiment is a natural wood grain.

The decoration layer 5 illustrated in FIG. 3 is a member which is formed of a metal material and has an approximately uniform layer thickness. Furthermore, in this embodiment, the layer thickness of the decoration layer 5 is defined by the shortest distance between an outer surface of the decoration layer 5 on a side in contact with the outer layer 2 (a front side 5a) and an outer surface of the decoration layer 5 on a side in contact with the molded resin layer 7 (a back side 5b). The decoration layer 5 is arranged on the entire back side 2b of the outer layer 2.

A portion of the decoration layer 5 which is visible through the through hole 3 of the outer layer 2 is an inlay pattern portion 6 which is seen as though inlay work is performed with respect to the outer layer 2. The inlay pattern portion 6 is a portion of the decoration layer 5 which is curved and deformed entering the through hole 3 of the outer layer 2 from the back side 2b of the outer layer 2. In this embodiment, the inlay pattern portion 6 is arranged in the through hole 3 such that the inlay pattern portion 6 is approximately flush with the front side 2a of the outer layer 2. The inlay pattern portion 6 is coherent to an opening end 4 positioned on the back side of the outer layer 2 in the opening of the through hole 3 of the outer layer 2. Further, the inlay pattern portion 6 is curved with respect to a surface along the back side 2b of the outer layer 2 towards the inside of the through hole 3 of the outer layer 2.

The molded resin layer 7 is arranged on the back side 5b of the decoration layer 5. The back side 5b is opposite to the front side 5a which is in contact with the outer layer 2. The molded resin layer 7 holds the outer layer 2 and the decoration layer 5 in a predetermined three-dimensional shape.

Figure 4:
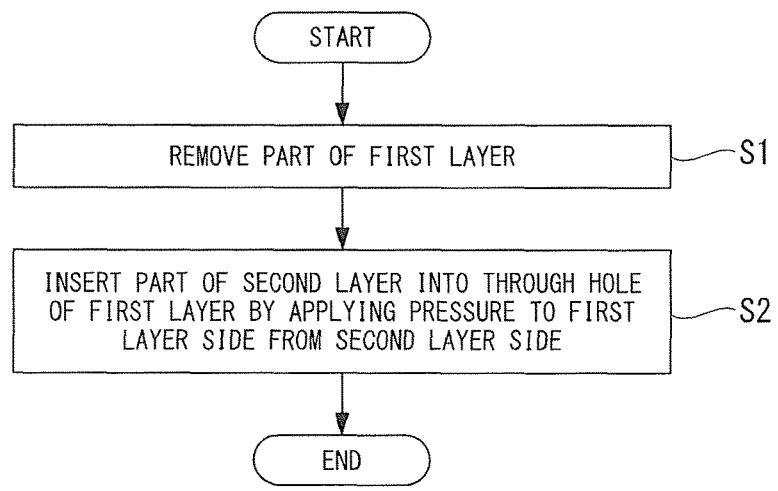
FIG. 4 is a flowchart illustrating a manufacturing method of the decoration panel of the first embodiment.

Next, a manufacturing method of the decoration panel 1 of this embodiment will be described. FIG. 4 is a flowchart illustrating a manufacturing method of the decoration panel of this embodiment. FIG. 5 to FIG. 8 are sectional views illustrating a manufacturing step of the decoration panel of this embodiment.

Figure 5:
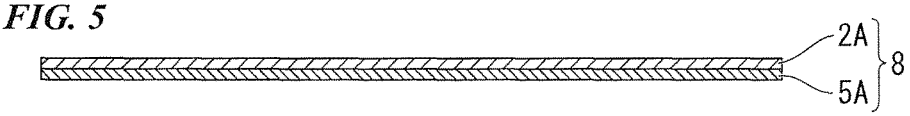
FIG. 5 is a sectional view illustrating a manufacturing step of the decoration panel of the first embodiment.

In this embodiment, as illustrated in FIG. 5, the decoration panel 1 is manufactured by using a flat plate-like stacked body 8 formed by stacking a first layer 2A which becomes the outer layer 2 illustrated in FIG. 3 after being manufactured and a second layer 5A which becomes the decoration layer 5 illustrated in FIG. 3 after being manufactured. The first layer 2A and the second layer 5A of the stacked body 8 are fixed to each other by an adhesive agent.

Figure 6:
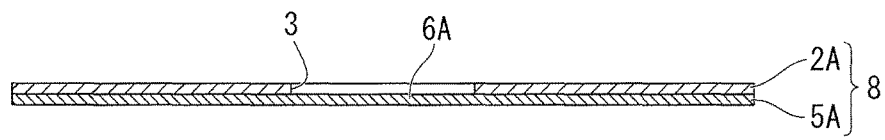
FIG. 6 is a sectional view illustrating a manufacturing step of the decoration panel of the first embodiment.

First, as illustrated in FIG. 6, part of the first layer 2A is removed such that the second layer 5A is exposed in a state where the stacked body 8 has the shape of a flat plate (refer to an outer layer processing step, Step S1, and FIG. 4).

In Step S1, which region of the first layer 2A is removed is determined according to the design of the decoration panel 1. That is, in Step S1, the through hole 3 having a predetermined pattern corresponding to the design is formed in the first layer 2A. Examples of a method of removing part of the first layer 2A include a method of removing the first layer 2A by using laser processing. When the laser processing is used, fine processing according to the width of laser processing can be performed. In addition, in the laser processing, an output, a pulse, and the like are suitably set such that the first layer 2A formed of a wooden material and the adhesive agent between the first layer 2A and the second layer 5A can be removed but the second layer 5A formed of a metal material is not removed, and thus the first layer 2A is removed into the shape of a pattern such that the outer surface of the second layer 5A is exposed.

Furthermore, the method of removing part of the first layer 2A is not limited to the laser processing.

Then, Step S1 ends and the process proceeds to Step S2.

Figure 7:
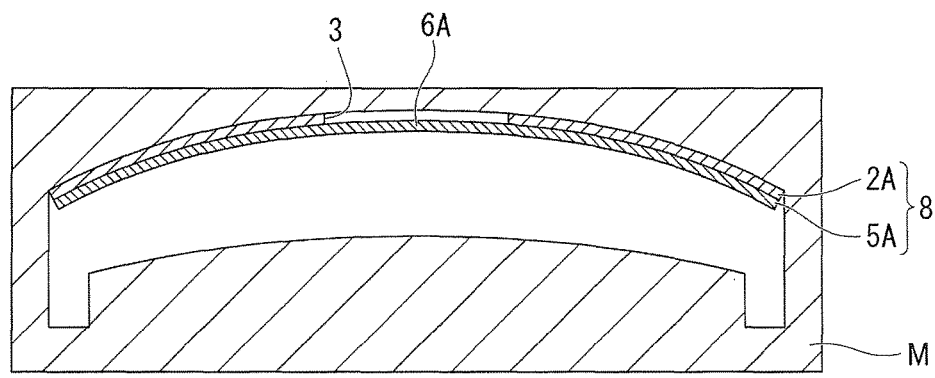
FIG. 7 is a sectional view illustrating a manufacturing step of the decoration panel of the first embodiment.
Figure 8:
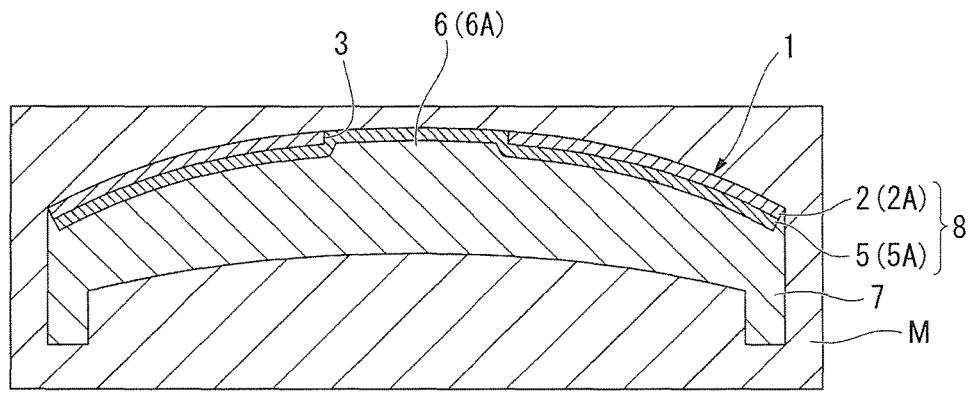
FIG. 8 is a sectional view illustrating a manufacturing step of the decoration panel of the first embodiment.

Step S2 is a molding step of inserting part of the second layer 5A into the through hole 3 of the first layer 2A by applying a pressure to the first layer 2A side from the second layer 5A side. In Step S2 of this embodiment, an outer surface of the first layer 2A (a front side of the first layer 2A) on a side opposite to a surface in contact with the second layer 5A is brought into contact with a predetermined molding die M, and insert molding is performed as illustrated in FIG. 7 and FIG. 8.

In Step S2, for example, the insert molding is performed by selecting various shaped molding dies M such as a molding die M formed along the front side of the first layer 2A for covering the through hole 3 which is formed in the first layer 2A by removing part of the first layer 2A, and a molding die M having concavities and convexities in a portion in which the through hole 3 is positioned according to the design.

For example, when the molding die M along the front side of the first layer 2A is used for covering the through hole 3 which is formed in the first layer 2A, the stacked body 8 is attached into the molding die M, and then a fluid body of an insert resin flows into the molding die M, whereby the insert resin comes into contact with the second layer 5A, and the stacked body 8 is pressed from the second layer 5A side. Further, the fluid body of the insert resin is solidified into a predetermined shape according to the shape of the molding die M in a state where the insert resin is in contact with the second layer 5A.

When the insert resin presses the stacked body 8 from the second layer 5A side, the second layer 5A is curved and deformed such that part of the second layer 5A is inserted into the through hole 3 of the first layer 2A. An aspect of curving and deforming the second layer 5A in the through hole 3 of the first layer 2A is different according to the injection pressure of the insert resin. The injection pressure of the insert resin is set according to the opening area and the opening shape of the through hole 3 of the first layer 2A, and the material and the layer thickness of the second layer 5A.

For example, when the second layer 5A enters the through hole 3 of the first layer 2A such that the second layer 5A is convexly curved towards the front side from the back side of the first layer 2A, the outer surface of the second layer 5A has the shape of an arch until the second layer 5A comes into contact with the molding die M. When the second layer 5A reaches the molding die M through the through hole 3 of the first layer 2A, the second layer 5A is deformed into a shape according to the shape of the molding die M. When the second layer 5A reaches the molding die M in the molding die M formed along the front side of the first layer 2A for covering the through hole 3 which is formed in the first layer 2A, the outermost surface of the second layer 5A is flush with the front side of the first layer 2A. In addition, when the injection pressure of the insert resin is preferably set in the molding die M formed along the front side of the first layer 2A for covering the through hole 3 which is formed in the first layer 2A, the second layer 5A is deformed such that the through hole 3 of the first layer 2A is completely filled with the second layer 5A, and the outermost surface of the stacked body 8 becomes smooth.

Then, Step S2 ends. After Step S2 ends, an inlay pattern which is seen as though the through hole 3 is filled with the second layer 5A is formed on the front side of the stacked body 8.

As necessary, additional steps of coating the outer surface of the first layer 2A or of performing post-processing such as grinding with respect to the front side of the first layer 2A or the second layer 5A may be performed after Step S2.

According to the manufacturing method of the decoration panel 1 of this embodiment, unlike the inlay work of the related art, an inlay component can be produced by molding a sheet-like second layer 5A. In Step 1 described above, the stacked body 8 has the shape of a flat plate, and thus processing at the time of removing part of the first layer 2A from the stacked body 8 is easily performed. In particular, in the laser processing, it is necessary to perform the processing by aligning the focal point of laser light with a suitable position, and in the laser processing with respect to a three-dimensional structure, it is necessary to frequently moving the focal point. In contrast, in this embodiment, processing of removing part of the sheet-like first layer 2A from the flat plate-like stacked body 8 is performed, and thus it is possible to reduce the change frequency of the position of the focal point during the laser processing, and it is possible to easily perform the processing with high accuracy.

In addition, in this embodiment, in Step S1 described above, the first layer 2A adheres to the second layer 5A, and it is possible to form the inlay pattern of the second layer 5A in the through hole 3 of the first layer 2A without separating the first layer 2A from the second layer 5A. For this reason, in comparison to work of inserting an inlay member into a groove as in the inlay work of the related art, there is no position shift between the groove (the through hole 3 of this embodiment) and the inlay work (the second layer 5A of this embodiment). In addition, in the inlay work of the related art, in a step of inserting the inlay member into the groove, a processing error of the groove and a processing error of the inlay member occur, and thus the inlay member may not enter the groove or a useless gap may be formed between the groove and the inlay member. In contrast, in this embodiment, the outline of the through hole 3 formed in the first layer 2A is a starting point of the curve and the deformation of the second layer 5A, and thus it is possible to easily form the inlay pattern having excellent appearance with high accuracy such that the inlay member is inserted into the groove without having a gap.

In addition, in this embodiment, a design is made by removing part of the first layer 2A from the flat plate-like stacked body 8, and the stacked body 8 is caused to have a three-dimensionally curved shape. Therefore, freedom at the time of making the design is high. In addition, in the inlay work of the related art, when the design is changed at the time of forming a groove for inlay in a three-dimensional body, it is necessary to perform complicated setting change of changing a molding step of the groove. In contrast, in the manufacturing method of this embodiment in which part of the first layer 2A of the flat plate-like stacked body 8 is removed first, it is possible to easily perform the setting change when there is a change in the design.

For this reason, when products having various designs are produced in a small amount, manufacturing facilities or portions of the setting change for each design are reduced, and thus productivity is high.

(Modification Example)

Next, a modification example of the embodiment described above will be described.

The shape of the molding die M is not limited to the shapes described in the embodiment described above. For example, according to a molding die including a first molding surface which is in contact with the front side 2a of the first layer 2A, and a second molding surface lower than the first molding surface, an inlay pattern is formed by insert molding in which the second layer 5A protrudes from the front side 2a of the first layer 2A. A manufacturing method of the decoration panel of this modification example is able to easily form an inlay pattern having excellent appearance with high accuracy such that an inlay member is inserted into a groove without having a gap.

(Second Embodiment)

Figure 9:
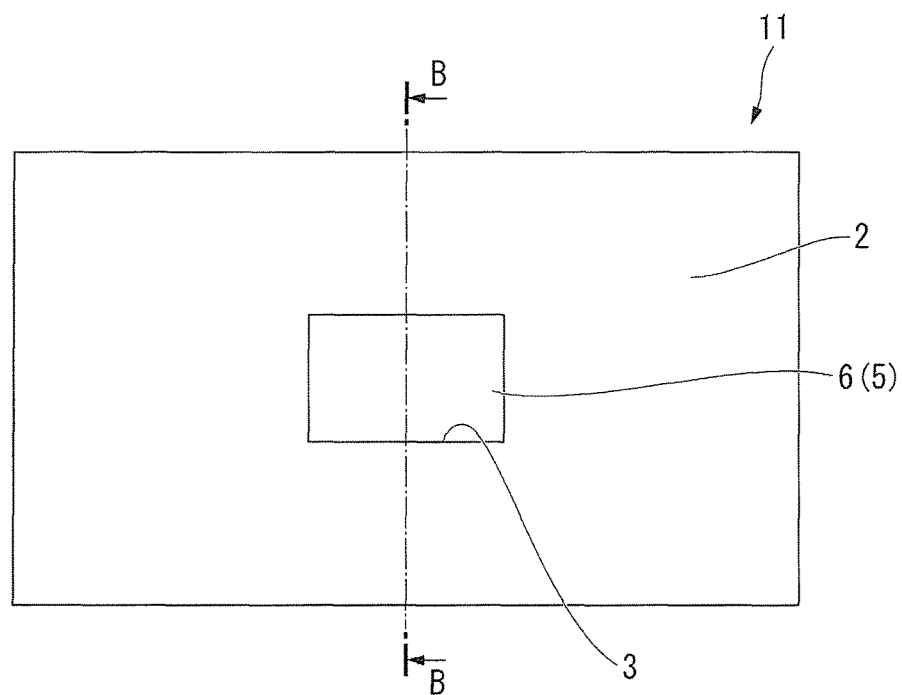
FIG. 9 is a plan view illustrating a decoration panel according to a second embodiment of the present invention.
Figure 10:
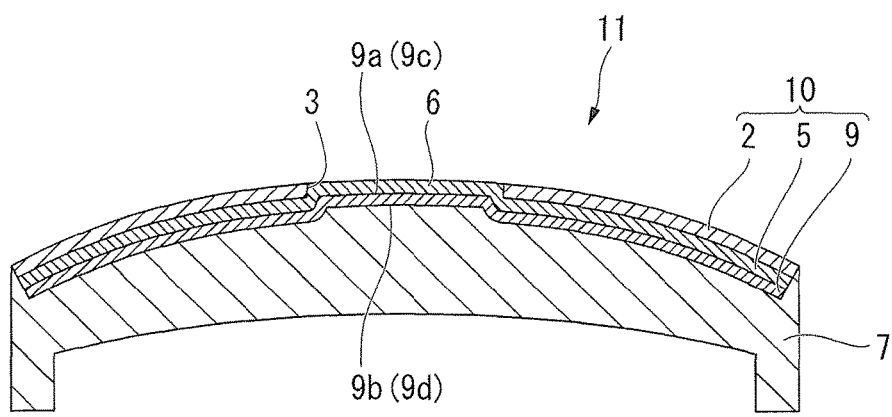
FIG. 10 is a sectional view cut along line B-B of FIG. 9.

A second embodiment of the present invention will be described. FIG. 9 is a plan view illustrating a decoration panel of this embodiment. FIG. 10 is a sectional view cut along line B-B of FIG. 9.

As illustrated in FIG. 9 and FIG. 10, a configuration of a decoration panel 11 is different from that of the first embodiment described above in that an inner layer 9 is provided between the decoration layer 5 and the molded resin layer 7.

The decoration panel 11 is a panel in which the molded resin layer 7 is integrated with a stacked body 10 formed by stacking the outer layer 2, the decoration layer 5, and the inner layer 9 in this order by the insert molding such that the molded resin layer 7 is in contact with the inner layer 9.

The inner layer 9 is a sheet-like member arranged on an outer surface of the decoration layer 5 (the back side 5b) on a side opposite to a surface (the front side 5a) which is in contact with the outer layer 2. The inner layer 9 has an approximately uniform layer thickness. The inner layer 9 may be formed of the same material as that of the outer layer 2. For example, when the outer layer 2 is formed of wood, the inner layer 9 may be formed of wood, and the types of tree may be identical to each other or different from each other. In addition, it is preferable that the inner layer 9 has about the same thermal or moisture expansion coefficient as that of the outer layer 2.

Curved surfaces 9c and 9d which are convexly curved in a direction towards the front side of the outer layer 2 from the back side of the outer layer 2 along the layer thickness direction of the outer layer 2 are provided in a region within the opening of the through hole 3 of the outer layer 2 when the inner layer 9 is seen from a layer thickness direction of the outer layer 2. The curved surfaces 9c and 9d of the inner layer 9 are surfaces which are formed during the insert molding of the molded resin layer 7.

The molded resin layer 7 of this embodiment is arranged on an outer surface of the inner layer 9 (a back side 9b) on a side opposite to a surface (a front side 9a) in contact with the decoration layer 5. The molded resin layer 7 holds the outer layer 2, the decoration layer 5, and the inner layer 9 in a predetermined three-dimensional shape.

Figure 12:
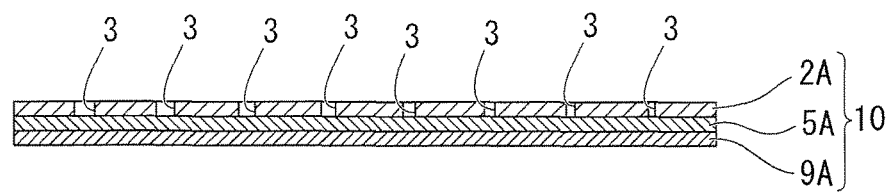
FIG. 12 is a sectional view cut along line C-C of FIG. 11.

In a manufacturing method of the decoration panel 1 of this embodiment, the stacked body 10 which is formed by stacking the first layer 2A which becomes the outer layer 2 after being manufactured, the second layer 5A which becomes the decoration layer 5 after being manufactured, and a third layer 9A which becomes the inner layer 9 after being manufactured in this order, and by fixing the layers by adhesion is used instead of the stacked body 8 described in the first embodiment (refer to FIG. 12).

The stacked body 10 of this embodiment has a sandwich-like stacked structure in which the second layer 5A is interposed between the first layer 2A and the third layer 9A. The third layer 9A has an approximately uniform layer thickness. Further, the first layer 2A and the third layer 9A are formed of the same material, or are formed of materials having about the same thermal or moisture expansion coefficient. For this reason, in the stacked body 10 of this embodiment, distortion due to an influence of an environmental change such as a change in temperature or humidity rarely occurs.

As with the first embodiment described above, a design is formed by removing part of the first layer 2A from the stacked body 10 of this embodiment (refer to Step S1 of the first embodiment), and after that, the insert molding is performed in the molding die M such that the insert resin comes into contact with the third layer 9A (refer to Step S2 of the first embodiment).

According to such a manufacturing method, as with the first embodiment described above, an inlay pattern having excellent appearance which is seen as though the inlay work is accurately formed can be easily formed.

(Example)

Figure 11:
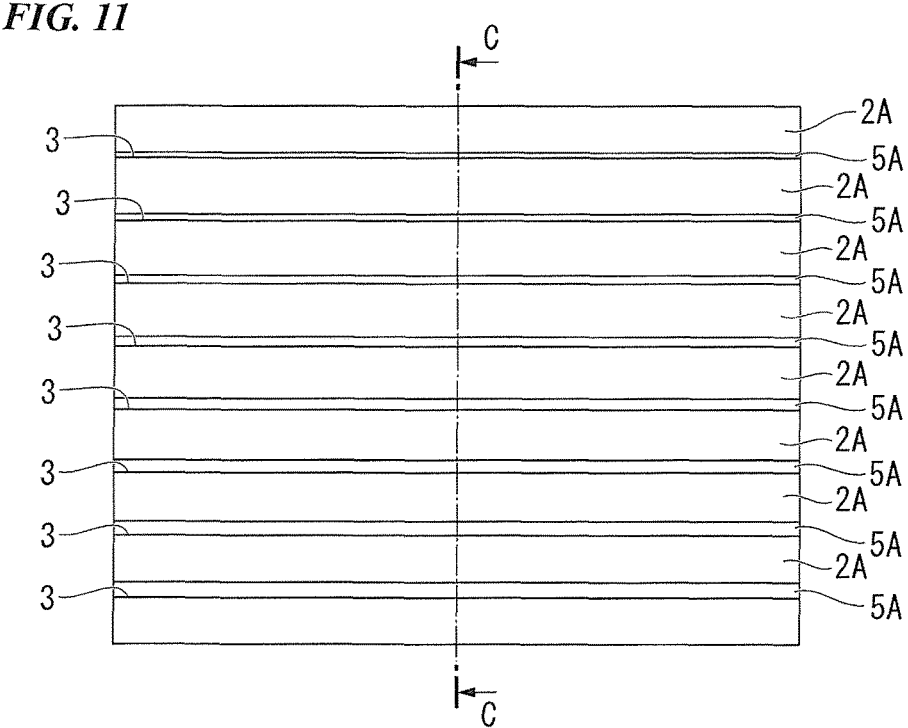
FIG. 11 is a plan view illustrating a stacked body of an example of the present invention.

Next, an example of a decoration panel formed from the stacked body 10 used in the second embodiment will be described in more detail. FIG. 11 is a plan view of a stacked body of an example of the present invention. FIG. 12 is a sectional view cut along line C-C of FIG. 11. Furthermore, FIG. 11 and FIG. 12 illustrate a flat plate-like stacked body 10 in a state where the through hole 3 is formed in the first layer 2A.

In this example, as illustrated in FIG. 11 and FIG. 12, a manufacturing example will be exemplified in which the decoration panel 11 disclosed in the second embodiment described above is manufactured by using the stacked body 10 in which the outer layer 2 formed of a wooden material, the decoration layer 5 formed of a metal material, and the inner layer 9 formed of a wooden material are stacked in this order.

The first layer 2A and the third layer 9A which become the outer layer 2 and the inner layer 9 are sheet-like layers having a thickness of 0.2 mm which are formed of the same natural wood.

The second layer 5A which becomes the decoration layer 5 is a thin plate material formed of metal.

The material types of the outer layer 2, the inner layer 9, and the decoration layer 5 of this example, and the layer thickness of the decoration layer 5 are shown in Table 1 described below. In Table 1, "A1050" and "A5052" shown in a section of "Material Type of Decoration Layer" are grades set in JIS H 4000 (a plate and a bar of aluminum and an aluminum alloy).

TABLE 1

| | Material Type of Decoration Layer | Thickness of Decoration Layer | Material types of Outer Layer and Inner Layer |
|---|---|---|---|
| Example 1 | Pure Aluminum A1050 | 0.3 mm | Bubinga |
| Example 2 | Pure Aluminum A1050 | 0.3 mm | Sapele |
| Example 3 | Pure Aluminum A1050 | 0.5 mm | Bubinga |
| Example 4 | Pure Aluminum A1050 | 0.5 mm | Sapele |
| Example 5 | Aluminum Alloy A5052 | 0.5 mm | Bubinga |
| Example 6 | Aluminum Alloy A5052 | 0.5 mm | Sapele |

In Example 1 to Example 6 shown in Table 1 described above, the values of the injection pressure at which the second layer 5A (the decoration layer 5) deformed by a strip-like through hole 3 formed by removing the first layer 2A which becomes the outer layer 2 into the shape of a strip can be visually recognized are shown in Table 2 described below. The expression "the second layer deformed by the through hole can be visually recognized" indicates that a curve occurring on the outer surface of the second layer 5A seen through the through hole 3 of an insert resin-attached stacked body 10 after the insert molding can be visually recognized with respect to a flat plate-like outer surface of the second layer 5A seen through the through hole 3 of the stacked body 10 before the insert molding.

TABLE 2

| Width of Through Hole 3 | Example 1 | Example 2 | Example 3 | Example 4 | Example 5 | Example 6 |
|---|---|---|---|---|---|---|
| 0.4 mm | 1800 kgf/cm$^2$ | 1800 kgf/cm$^2$ | | | | |
| 0.5 mm | 1500 kgf/cm$^2$ | 1800 kgf/cm$^2$ | | | | |
| 0.6 mm | 1200 kgf/cm$^2$ | 1500 kgf/cm$^2$ | | | | |
| 0.7 mm | 900 kgf/cm$^2$ | 1200 kgf/cm$^2$ | 1800 kgf/cm$^2$ | 1800 kgf/cm$^2$ | | |
| 0.8 mm | 900 kgf/cm$^2$ | 900 kgf/cm$^2$ | 1500 kgf/cm$^2$ | 1200 kgf/cm$^2$ | | |
| 1.0 mm | 900 kgf/cm$^2$ | 900 kgf/cm$^2$ | 1200 kgf/cm$^2$ | 1200 kgf/cm$^2$ | | |
| 1.5 mm | 900 kgf/cm$^2$ | 900 kgf/cm$^2$ | 900 kgf/cm$^2$ | 900 kgf/cm$^2$ | 1500 kgf/cm$^2$ | 1200 kgf/cm$^2$ |
| 2.0 mm | 900 kgf/cm$^2$ | 900 kgf/cm$^2$ | 900 kgf/cm$^2$ | 900 kgf/cm$^2$ | 900 kgf/cm$^2$ | 900 kgf/cm$^2$ |
| 5.0 mm | 900 kgf/cm$^2$ | 900 kgf/cm$^2$ | 900 kgf/cm$^2$ | 900 kgf/cm$^2$ | 900 kgf/cm$^2$ | 900 kgf/cm$^2$ |

In each of the examples, four conditions of 900 kgf/cm$^2$, 1200 kgf/cm$^2$, 1500 kgf/cm$^2$, and 1800 kgf/cm$^2$ were set as the injection pressure of the insert molding. In Table 2 described above, the lowest injection pressure at which the second layer 5A deformed by the through hole 3 can be visually recognized for each width of the through hole 3 in each of the examples is shown. The blanks of Table 2 described above indicate that the second layer 5A deformed by the through hole 3 is not able to be visually recognized in conditions where the injection pressure is 1800 kgf/cm$^2$.

As understood from Table 2 described above, the injection pressure required for forming a suitable inlay pattern gradually decreases as the width of the through hole 3 becomes wider. In addition, even in any conditions of Example 1 to Example 6, when the width of the through hole 3 is greater than or equal to 1.5 mm, a suitable inlay pattern can be formed.

In addition, an influence of a difference in the material types of the outer layer 2 and the inner layer 9 to the injection pressure required for forming a suitable inlay pattern is small. For this reason, it is considered that the material type of the outer layer 2 and the inner layer 9 is able to be suitably selected from wide choices according to a request on design insofar as the material of the outer layer 2 and the inner layer 9 is a wooden material.

As described above, the embodiment of the present invention is described with reference to the drawings, but the specific configuration thereof is not limited to the embodiment, and also includes modifications within a range not deviating from the gist of the present invention.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A decoration panel, comprising:
   a non-planar outer layer having a through hole formed thereon and a first curvature, and wherein the through hole is opened to a front side and a back side of the outer layer;
   a decoration layer arranged on the back side of the outer layer with an approximately uniform layer thickness, wherein the decoration layer includes an inlay pattern portion which is part of the decoration layer, and which has a second curvature to enter the through hole from the back side of the outer layer; and
   a non-planar inner layer arranged on a surface of the decoration layer on a side opposite to a surface which is in contact with the outer layer and having an approximately uniform layer thickness, and a third curvature,
   wherein the third curvature of the inner layer matches the first curvature of the outer layer, the inner layer has a surface convexly curved in a direction towards the front side of the outer layer from the back side of the outer layer along a layer thickness direction of the outer layer in a region within the through hole as seen from the layer thickness direction of the outer layer, and the convex curvature of the surface of the inner layer corresponds to the second curvature of the inlay pattern portion,
   wherein the inner layer is formed of a material different from that of the decoration layer,
   wherein the outer layer includes natural wood, the inner layer includes natural wood, and the decoration layer is formed of a material which is different from that of the outer layer,
   wherein the decoration panel further comprises a molded resin layer arranged on a surface of the inner layer on a side opposite to a surface which is in contact with the decoration layer, and
   wherein the molded resin layer is formed by injection pressure, and wherein the injection pressure which forms the molded resin layer also produces the third curvature of the inner layer and the second curvature of the inlay pattern portion of the decoration layer.

2. A decoration panel, comprising:
   a non-planar outer layer having a through hole formed thereon and a first curvature, and wherein the through hole is opened to a front side and a back side of the outer layer;
   a decoration layer arranged on the back side of the outer layer with an approximately uniform layer thickness, wherein the decoration layer includes an inlay pattern portion which is part of the decoration layer, and which has a second curvature to enter the through hole from the back side of the outer layer; and
   a non-planar inner layer arranged on a surface of the decoration layer on a side opposite to a surface which is in contact with the outer layer and having an approximately uniform layer thickness, and a third curvature,
   wherein the third curvature of the inner layer matches the first curvature of the outer layer, the inner layer has a surface convexly curved in a direction towards the front side of the outer layer from the back side of the outer layer along a layer thickness direction of the outer layer in a region within the through hole as seen from the layer thickness direction of the outer layer, and the convex curvature of the surface of the inner layer corresponds to the second curvature of the inlay pattern portion,
   wherein the inner layer has about the same expansion coefficient as that of the outer layer,
   wherein the outer layer includes natural wood, the inner layer includes natural wood, and the decoration layer is formed of a material which is different from that of the outer layer,
   wherein the decoration panel further comprises a molded resin layer arranged on a surface of the inner layer on a side opposite to a surface which is in contact with the decoration layer, and
   wherein the molded resin layer is formed by injection pressure, and wherein the injection pressure which forms the molded resin layer also produces the third curvature of the inner layer and the second curvature of the inlay pattern portion of the decoration layer.

3. The decoration panel according to claim 2, wherein the decoration layer is coherent to at least an opening end of the through hole on the back surface side with the inlay pattern portion, and the second curvature of the inlay pattern portion is curved towards an inside of the through hole.

4. The decoration panel according to claim 2, wherein the decoration layer is formed of a metal material.

5. A decoration panel, comprising:
   a non-planar outer layer having a through hole formed thereon and an outward first curvature, and wherein the through hole is opened to a front side and a back side of the outer layer;
   a decoration layer arranged on the back side of the outer layer with an approximately uniform layer thickness, wherein the decoration layer includes an inlay pattern portion which is part of the decoration layer, and which has a second curvature to enter the through hole from the back side of the outer layer; and a non-planar inner layer arranged on a surface of the decoration layer on a side opposite to a surface which is in contact with the outer layer and having an approximately uniform layer thickness, and a third curvature, wherein the third curvature of the inner layer matches the first curvature of the outer layer, the inner layer has a surface convexly curved in a direction towards the front side of the outer layer from the back side of the outer layer along a layer thickness direction of the outer layer in a region within the through hole as seen from the layer thickness direction of the outer layer, and the convex curvature of the surface of the inner layer corresponds to the second curvature of the inlay pattern portion, wherein the inner layer includes natural wood, the outer layer includes natural wood, and the outer layer is formed of the same material as that of the outer layer, wherein the decoration layer is coherent to at least an opening end of the through hole on the back surface side with the inlay pattern portion, and is curved towards an inside of the through hole, wherein the inlay pattern portion has a peripheral surface, the through hole has an outer end at the front side of the outer layer, and a peripheral surface facing the inside of the through hole between the opening end and the outer end, the peripheral surface of the inlay pattern portion is opposed to the peripheral surface of the through hole, the inner layer contacts the opening end of the through hole, and the inlay pattern portion does not contact the outer end of the through hole, such that the opposed peripheral surfaces of the inlay pattern portion and the through hole form an outwardly opening gap, wherein the decoration panel further comprises a molded resin layer arranged on a surface of the inner layer on a side opposite to a surface which is in contact with the decoration layer, and wherein the molded resin layer is formed by injection pressure, and wherein the injection pressure which forms the molded resin layer also produces the third curvature of the inner layer and the second curvature of the inlay pattern portion of the decoration layer.

6. The decoration panel according to claim 5, wherein the decoration layer is formed of a metal material.

* * * * *